No. 12,529. REISSUED SEPT. 4, 1906.

H. A. OLSSON.

BOTTLE CLOSURE.

APPLICATION FILED FEB. 3, 1906.

Witnesses:
John A. Rennie
Henry R. Bauer

Inventor:
Henry A. Olsson.
By
Starr Cross & Bowersock
his Attorneys.

UNITED STATES PATENT OFFICE.

HENRY A. OLSSON, OF NEW YORK, N. Y., ASSIGNOR OF ONE-THIRD TO HIMSELF, ONE-THIRD TO ALBERT WILLIAMSON, AND ONE-THIRD TO EDWARD WILLIAMSON, OF NEW YORK, N. Y.

BOTTLE-CLOSURE.

No. 12,529. Specification of Reissued Letters Patent. Reissued Sept. 4, 1906.

Original No. 804,619, dated November 14, 1905. Application for reissue filed February 3, 1906. Serial No. 299,374.

*To all whom it may concern:*

Be it known that I, HENRY ALBERT OLSSON, a citizen of the United States, and a resident of the city of New York, borough of Brooklyn, in the county of Kings and State of New York, have invented a new and Improved Bottle-Closure, of which the following is a full, clear, and exact description.

The principal object of my invention is to provide means for effectually closing the tops of bottles and other receptacles, and while it is capable of general use it is especially adapted for use on milk-bottles. Many schemes have been tried for closing receptacles of this kind in such a manner as to prevent the contents from being spilled and also to prevent foreign matter from entering them. One of the great troubles with milk-bottles is that they are placed in ice-boxes with ice and other bottles above them, so that a fragile cover is likely to be broken or bent, and the sediment from the ice necessarily settles in a pool on the top of the closure when the ordinary paper disks are employed. Practically all of the other closures which have been adopted for this purpose are expensive, and they also have faults which render them of very little more value than the paper disks.

My invention comprises means for effectually closing bottles of this character and also for protecting the interior of the bottle from the entrance of dirt and the like, the whole device being formed in such a manner as to render it inexpensive, easily constructed, and employed and particularly readily removed at any time without the necessity for the employment of any form of tool or implement.

Reference is to be had to the accompanying drawings, forming a part of this specification, in which similar characters of reference indicate corresponding parts in all the figures.

Figure 1:
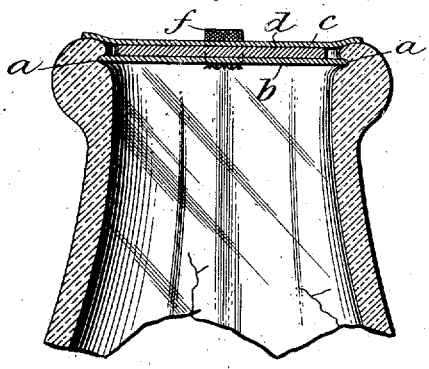
Figure 2:
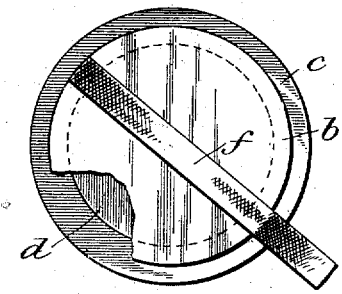
Figure 3:
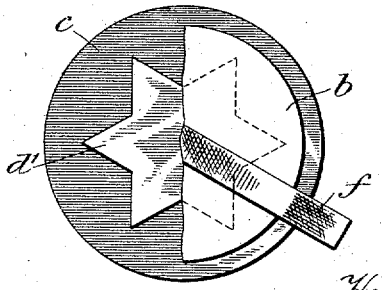

Figure 1 is a vertical sectional view of the top of a milk-bottle, showing a closure comprising the features of my invention. Fig. 2 is a bottom plan view of the closure shown in Fig. 1; and Fig. 3 is a similar view to Fig. 2, showing a modification.

Bottles of this character are usually provided with a depression *a* near the top, which is adapted to receive the ordinary paper disk now extensively employed. In this depression I place a disk *b*, similar to the old style, but provided with a covering-sheet *c*, having a larger diameter than that of the disk *b* and extending above the top edge of the bottle, so as to prevent the entrance of foreign matters between it and the top of the bottle. These two disks or sheets are separated from each other by means of what I may term a "spacer" *d*, which is smaller in diameter than either of the others, so that the disk *d* projects beyond the disk *d* all around and affords resilient flanges which hold the closure in the bottle-neck. The construction described provides a space *e* between the disks *b* and *c* and between the disk *d* and the neck of the bottle. As milk expands upon being kept in the receptacle, particularly if the temperature thereof is permitted to rise, this space also affords a small chamber for receiving any fluid which may be forced past the edges of the disk *b*, and thus not smear any portion of the exterior of the closure likely to be touched by the hand in opening or, in other words, the real outer or exposed surface of the closure.

From the description given it will be clear that the lower disk *b* accomplishes every purpose which the ordinary single disk can accomplish, and in addition thereto the top disk or sheet *c* effectually protects the bottle, as described. The device can be readily put in position without any additional trouble, and it can also be removed when desired by inserting a finger under the edge of the covering-sheet *c*, and thereby securing a firm hold upon said sheet by means of which the disk *b* may be easily and readily withdrawn, or should the covering-sheet *c* not be sufficiently flexible to permit of the insertion of the finger under the edge thereof removal of my closure may be effected by placing a knife under the edge of the sheet *c* and, if necessary, engaging the end of the knife with the disk *d*. If this is not sufficient, the closure may be supplied with a strip *f* of cloth or the like across the bottom of the disk *b* and projecting at the sides for convenience in detaching it from the bottle.

The two disks *b* and *c* are preferably made of paraffin-paper, while the central disk may be made of one or several sheets of strawboard, or it may be formed by a block of wood. The three parts may be secured together in any desired way—as, for instance, by shellac.

In the form shown in Fig. 3 the disk *d* is replaced by a block *d'*, having a different shape, but affording a space of larger size.

Having thus described my invention, I claim as new and desire to secure by Letters Patent—

1. A bottle-closure comprising two disks and means for holding them at a distance from each other, the disks being separated from each other at their edges whereby a marginal space is afforded when the closure is in position.

2. A bottle-closure comprising two disks of different diameters, and means for holding them at a distance from each other and affording a space between them, said means comprising a disk of the same shape as the first-mentioned disks, but of smaller diameter.

3. A bottle-closure comprising a disk adapted to enter the mouth of a bottle, and a sheet secured to the disk at a distance from the latter and adapted to cover the mouth of the bottle.

4. A bottle-closure comprising a disk adapted to enter the mouth of a bottle, a sheet secured to the disk at a distance from the latter and adapted to cover the mouth of the bottle, and a third disk between the first two and of a smaller diameter than either.

5. A closure for open-mouthed receptacles, comprising a sheet adapted to project over the mouth of a receptacle, and a disk of smaller diameter than the sheet, separated from the latter to provide a space therebetween, and adapted to enter the mouth of the receptacle.

6. A milk-bottle closure, comprising a pair of disks, one located above the other, the upper one being of larger diameter than the lower, a third disk located between the other two and of smaller diameter than either, and a strip of flexible material secured to the bottom of the lower disk and adapted to project beyond the upper disk.

7. A bottle-closure comprising two disks suitably connected and free of each other at their edges.

8. A bottle-closure comprising two disks having separated and free edges, and means for holding said edges at a distance from each other.

9. A bottle-closure comprising two disks centrally connected and the edges thereof being free and separable.

10. A bottle-closure comprising two substantially parallel disks of different diameters and means for holding the edges thereof at a distance from each other.

11. A closure for milk-bottles comprising two individual parts connected together, one of said parts fitting into the neck of the bottle and the other over the mouth of the bottle.

12. A bottle-closure comprising a disk adapted to enter the mouth of the bottle and a disk adapted to cover said mouth, said disks being connected substantially at their central portions only.

13. A closure for open-mouthed receptacles comprising a sheet adapted to project over and cover the mouth of a receptacle and a disk of smaller diameter than the sheet adapted to enter the mouth of the receptacle, said disk and sheet being suitably connected together and separated from each other at their edges.

14. A closure for bottles having an annular groove or recess in its neck portion, which comprises two circular parts suitably connected together, one of which parts has its edge portion fitting in said annular groove or recess and the other of which projects over the mouth of the bottle and serves as a hand-hold for removing the closure from the bottle.

In witness whereof I have signed my name to the foregoing specification in the presence of two subscribing witnesses.

HENRY A. OLSSON.

Witnesses:

HENRY R. BAUER,

FRED H. BOWERSOCK.